Feb. 14, 1939.     O. KYLIN     2,147,203

TAP HOLDER

Filed April 1, 1937     2 Sheets-Sheet 1

INVENTOR.
OSKAR KYLIN

BY Richey & Watts

ATTORNEYS

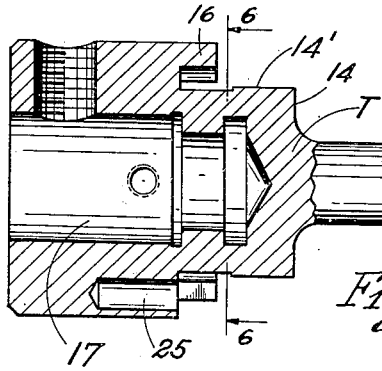
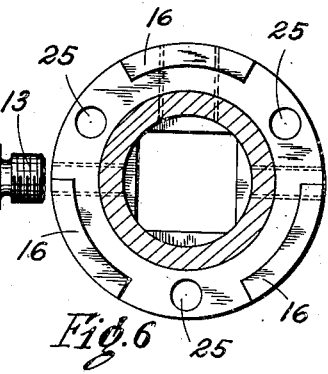
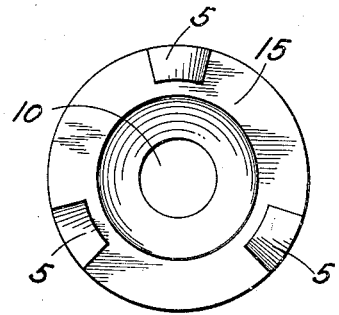
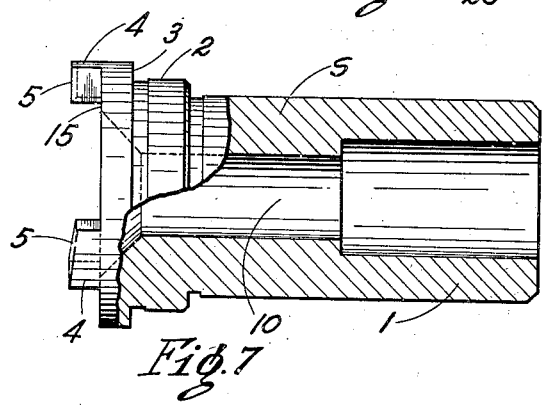
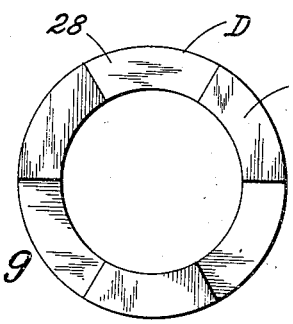
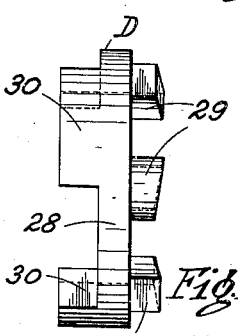
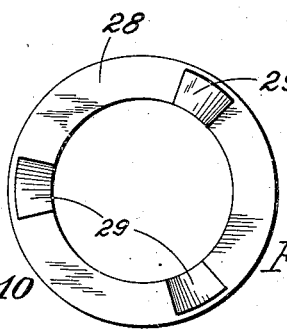
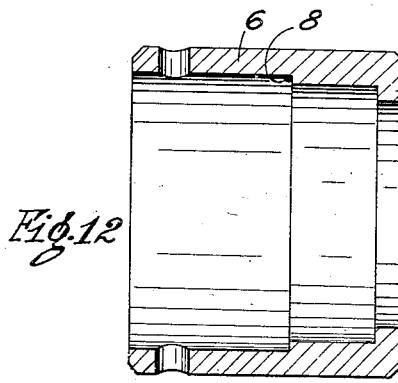
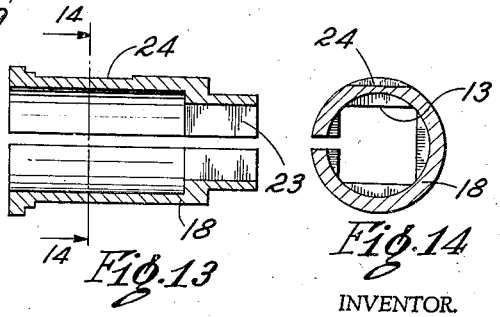

Patented Feb. 14, 1939

2,147,203

UNITED STATES PATENT OFFICE 2,147,203

TAP HOLDER

Oskar Kylin, Cleveland Heights, Ohio, assignor to Bardons & Oliver, Inc., Cleveland, Ohio, a corporation of Ohio Application April 1, 1937, Serial No. 134,313

5 Claims. (Cl. 10—89)

This invention relates to tap holders and more particularly to an improved holder for taps used in tapping holes in articles which are rotated while the tap is held stationary.

It is common practice to tap holes in articles which are chucked in a lathe or other machine tool. In doing this work the article being tapped is rotated and the tap is held still, and it is among the objects of the present invention to provide a releasing tap holder for use in such cases which will permit a hole to be tapped to any desired depth, the tap then released so it can rotate with the work to prevent breakage of the tool, and the tap then backed out upon reversal of the direction of rotation of the work.

Other objects of my invention are the provision of a simple, rugged and fool-proof releasing tap holder which is compact in structure and which will permit tapping a hole to various depths without changes or adjustments in the tap holder.

The above and other objects of my invention will appear from the following description of one embodiment thereof, reference being had to the accompanying drawings, in which Figure 1 is a plan view of the device with a tap inserted therein.

Figure 5 is a side elevation, partly in section, of the tap holding member of my device.

Figure 6 is a cross-section of the tap holding member shown in Figure 5 taken on line 6—6 of Figure 5.

Figure 7 is a side elevation, partly in section, of the stationary shank member.

Figure 8 is an end elevation of the part shown in Figure 7.

Figure 9 is a side view of the floating double clutch member.

Figure 10 is a side elevation of the double clutch of Figure 9.

Figure 11 is a view of the opposite side of the double clutch member from that shown in Figure 9.

Figure 12 is a sectional view of the sliding sleeve member.

Figure 13 is a transverse sectional view of a tap holding collet for my improved releasing tap holder.

Figure 14 is a cross-section taken on line 14—14 of Figure 13.

Figure 1:
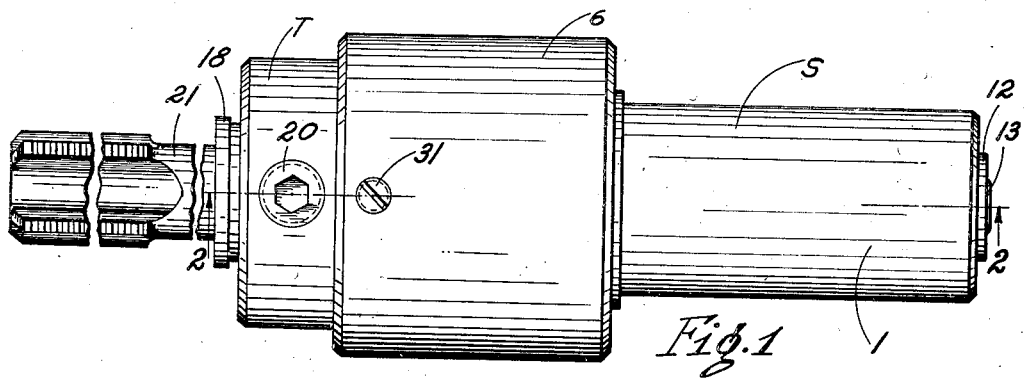

In describing my improved tap holder and its use it will be assumed that it is to be employed in tapping holes in work which is chucked and rotated by a lathe spindle while the tap is held in a tool holder which is adapted for movement toward and away from the work.

Referring to the drawings, my improved holder includes a shank S having a portion 1 adapted to be gripped in the tool holder of the machine tool, an enlarged bearing portion 2, a shoulder 3 and a plurality of spaced teeth 4 having inclined surfaces 5. A sleeve 6 has an inwardly extending flange 7 which engages the bearing portion 2 of the shank S and which is adapted to abut against the shoulder 3 of the shank S. This sleeve 6 also has a sliding engagement with the outer portions of the teeth 4 and is provided with a flange 8 for purposes to be later described.

The tap holding member T (Figs. 5 and 6) of the assembly includes a shank portion 9 which has a sliding fit in the bore 10 of the shank S. A spring 11 is disposed in the enlarged outer end of the bore in the shank S and is held in compression by means of the nut 12 which has threaded engagement with the end 13 of the tap holding member T. The spring 11 normally urges the member T into the position shown in Figure 2 with the surface 14 of the holder T in engagement with the inner flange 15 of the shank S. The member T includes a plurality of overhanging rectangular teeth members 16 and is provided with a bore 17 which accommodates the collet member 18 which may be of the usual type and has a squared inner end 19 which fits in a square hole in the member T. A set screw 20 holds the collet in position and the shank of the tap 21 has a squared inner end 22 which enters the correspondingly shaped recess 23 in the collet 18. A flat spot 24 is formed on the collet 18 and forms a seat for the set screw 20 whereby the screw also grips the tap in the split collet.

Figure 2:
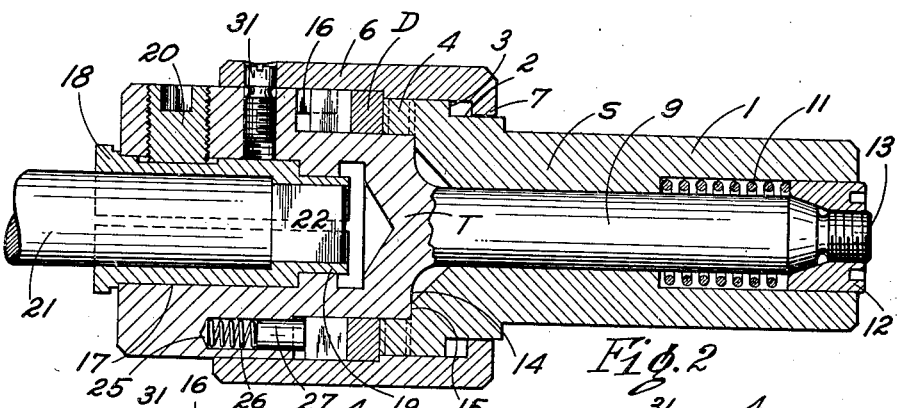
Figure 2 is a vertical sectional view taken on line 2—2 of Figure 1.

The member T has three equally spaced holes 25, disposed between the teeth 16 and extending parallel to the axis of the tap holder. As is seen in Figure 2 these holes 25 accommodate springs 26 and cylindrical buttons 27. The buttons 27 abut against the floating double clutch member D. As is best seen in Figures 9, 10 and 11 this double clutch member D comprises a ring portion 28 having three taper faced teeth 29 projecting from one side thereof and three rectangular teeth 30 projecting from the other side thereof. In the assembled device the double clutch member D is disposed between the toothed end of the shank S and the teeth on the member T. It has a bearing or support on the surface 14' of the member T and is housed by the sleeve 6. The rectangular teeth 30 are in constant engagement with the teeth 16 on the tap holding member T while the teeth 29 co-act with the teeth 4 of the shank S to obtain the desired operation of the device, as will be later explained.

The springs 26 and the buttons 27 normally urge the double clutch member D toward the shank S, tending to maintain the teeth 29 in engagement with the teeth 4 of the shank. A screw 31 extends through the sleeve 6 into the body of the tap holding member T and thus makes the sleeve 6 an integral part of the member T in the assembled device.

In operation, a tap 21 is inserted into the collet 18 and the shank S is firmly gripped in the tool holder of the lathe. The article which is to be tapped is secured to the rotating spindle of the lathe with the hole to be tapped aligned with the tap 21 and the spindle is rotated so that the work travels in a counterclockwise direction as viewed from the end of the machine which carries the tap holder. The operator then advances the tap holder until the tap engages the hole. The rotation of the work will cause the tap to cut threads in the hole and the operator preferably follows the movement of the tap into the hole by advancing the tool slide toward the work. When the tap has reached the desired depth in the hole means, such as a suitable stop, are provided for preventing the tool holder from further movement toward the work and this stopping of the tool holder will likewise stop the shank S. However, as the work continues to rotate and the tap 21 cannot rotate therewith due to engagement of the teeth 29 with the teeth 4 on the shank S and the engagement of the teeth 30 with the teeth 16 on the tap holding member T, further rotation of the work will cause the tap to be drawn further into the hole. As the tap is firmly secured in the holding member T this movement will cause the assembly of the holding member T and the sleeve 6 to move to the left relative to the shank S from the position shown in Figure 2 to that shown in Figures 3 and 4. This movement is limited, however, by the flange 7 on the sleeve 6 which engages the flange 3 on the fixed shank S.

Figure 3:
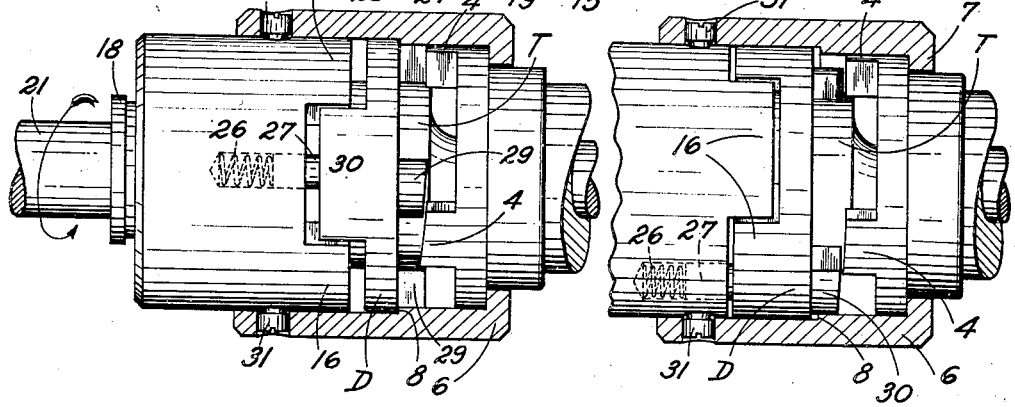
Figure 3 is a fragmentary view of the main operating parts of the tap holder with the outer sleeve cut away and showing the parts in the positions they assume when the tap has been released and is rotating with the work.
Figure 4:
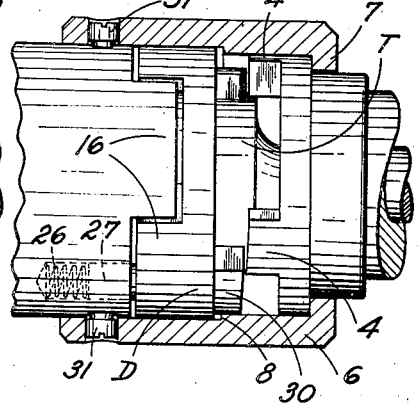
Figure 4 is a view generally similar to Figure 3 but showing the parts in the positions they assume when the teeth on the floating double clutch member are just about to slip off of the teeth on the shank of the holder.

It will be seen by inspection of Figures 3 and 4 that the movement of the sleeve 6 is accompanied by movement of the double clutch member D due to the engagement of the flange 8 on the sleeve 6 with the face of the double clutch member D. The displacement of the double clutch member D thus effected is just sufficient to permit the short ends of the teeth 29 to clear the short ends of the teeth 4 on the shank 1. This clearance will permit the tap holding member T, the sleeve 6 and the tap 21 to rotate freely with the work while the shank 1 is still rigidly held in the tool holder.

Further rotation of these parts, together with the double clutch member D which must necessarily rotate therewith due to the engagement of the teeth 30 with the teeth 16, in the direction of the arrow in Figure 3, will result in the double clutch member D moving to the left (Figs. 3 and 4) into the position shown in Figure 4 in which the springs 26 have been compressed, the face of the double clutch member D has moved away from the flange 8 of the sleeve 6 and the inclined teeth 29 have moved along the correspondingly inclined faces 5 of the teeth 4 until the two long edges of these teeth are just in engagement (Fig. 4). Further rotation of these members will cause the teeth 29 and 4 to become disengaged and the springs 26 will snap the double clutch member D back into the position shown in Figure 3. When the teeth 29 and 4 next come into alignment the shorter edges of the teeth are clear, as shown in Figure 3, and then the inclined faces will again slide upon each other until the teeth 29 again drop back into the position of Figure 3.

Thus, it will be seen that while the tap is rotating with the work the double clutch member D has an oscillating axial motion relative to the sleeve 6 and to the other parts of the device.

When it is desired to remove the tap from the hole it is only necessary to reverse the direction of rotation of the spindle. When this is done the long edges of the teeth 30 and 4 will immediately engage thus preventing rotation of the tap and, due to the thread which has been cut in the hole by the tap, rotation of the spindle will cause the tap to back out of the hole. If desired the operator may follow the tap out of the hole with the tool slide, or the tap may be permitted to move the tool slide without the assistance of the operator.

From the above description it will be seen that a hole of any depth, within practical limits, may be tapped and upon stopping the forward movement of the shank 1 and the tool holder in which it is secured, my releasing tap holder will automatically and with a definite predetermined further advance of the tap into the hole, release the tap from the holder and permit it to rotate freely with the work. Moreover, immediately upon the reversal of the direction of rotation of the work rotation of the tap will be prevented and the tap will be promptly backed out of the hole.

My apparatus is entirely self contained and automatic in operation. The parts are fully enclosed and there are no adjustments which need be made to take care of tapping holes of different depths. It will be understood that collets of various sizes may be used to accommodate the desired range of taps and although I have described the illustrated embodiment of my invention in considerable detail it will be understood by those skilled in the art that variations and modifications may be made in the form of the parts used without departing from the spirit of my invention. I do not therefore wish to be limited to the exact details of the apparatus illustrated herein but claim as my invention all embodiments thereof coming within the scope of the appended claims.

I claim:

1. A releasing tap holder including a shank having a tooth with an inclined face, a tap holding member having a tooth formed thereon and having a bearing in said shank, a double clutch member having teeth adapted to have driving engagement with the teeth on said shank and holding member respectively during both tap advancing and removing operations, the shank engaging tooth of said clutch member having an inclined face, spring means carried by said holding member and engaging said double clutch member whereby the inclined faced tooth on the clutch member is urged toward said shank, spring means adapted to urge said shank and holding member toward each other, and means for limiting the movement of said shank and holding member away from each other.

2. A releasing tap holder including a shank having inclined faced teeth, a tap holding member having clutch teeth, a double clutch member disposed between said shank and tap holding member and having one set of teeth constantly engaging said teeth on said tap holding member and having another set of inclined faced teeth adapted to be moved into and out of engagement with the corresponding inclined faced teeth on said shank, spring means tending to hold said shank and tap holding member in position with said last named sets of inclined faced teeth in engagement whereby relative rotation of said shank and tap holding member is prevented, and means for limiting axial movement of said tap holding member relative to said shank whereby said inclined faced teeth of said shank and double clutch member may clear and permit rotation of said tap holding member relative to said shank in one direction but, due to the inclined faces, will engage and prevent rotation of said tap holding member in the opposite direction.

3. A releasing tap holder including a shank, a tap holding member, a double clutch member disposed between said shank and tap holding member and having one set of teeth constantly engaging teeth on said tap holding member and having another set of inclined faced teeth adapted to be moved into and out of engagement with corresponding inclined faced teeth on said shank, spring means tending to hold said shank and tap holding member in position with said last named sets of inclined faced teeth in engagement whereby relative rotation of said shank and tap holding member is prevented, and means for limiting axial movement of said tap holding member relative to said shank whereby said inclined faced teeth of said shank and double clutch member may clear and permit rotation of said tap holding member relative to said shank in one direction but, due to the inclined faces, will engage and prevent rotation of said tap holding member in the opposite direction, said last named means including a sliding sleeve member having a flange adapted to coact with a shoulder upon the shank to limit the axial movement of the sleeve and tap holding member relative to said shank.

4. A releasing tap holder including a shank, a tap holding member, a double clutch member disposed between said shank and tap holding member and having one set of teeth constantly engaging teeth on said tap holding member and having another set of inclined faced teeth adapted to be moved into and out of engagement with corresponding inclined faced teeth on said shank, spring means tending to hold said shank and tap holding member in position with said last named sets of inclined faced teeth in engagement whereby relative rotation of said shank and tap holding member is prevented, means for limiting axial movement of said tap holding member relative to said shank whereby said inclined faced teeth of said shank and double clutch member may clear and permit rotation of said tap holding member relative to said shank in one direction but, due to the inclined faces, will engage and prevent rotation of said tap holding member in the opposite direction, said last named means including a sliding sleeve member having a flange adapted to coact with a shoulder upon the shank to limit the axial movement of the sleeve and tap holding member relative to said shank, and spring means carried by said tap holding member and engaging said double clutch member and tending to maintain said double clutch member in engagement with the teeth on said shank member.

5. A releasing tap holder including a shank, a tap holding member, a double clutch member disposed between said shank and tap holding member and having one set of teeth constantly engaging teeth on said tap holding member and having another set of inclined faced teeth adapted to be moved into and out of engagement with corresponding inclined faced teeth on said shank, spring means tending to hold said shank and tap holding member in position with said last named sets of inclined faced teeth in engagement whereby relative rotation of said shank and tap holding member is prevented, means for limiting axial movement of said tap holding member relative to said shank whereby said inclined faced teeth of said shank and double clutch member may clear and permit rotation of said tap holding member relative to said shank in one direction but, due to the inclined faces, will engage and prevent rotation of said tap holding member in the opposite direction, means for limiting axial movement of said tap holding member relative to said shank whereby said inclined faced teeth of said shank and double clutch member will clear and permit rotation of said tap holding member relative to said shank in one direction and will engage and prevent rotation of said tap holding member and shank in the opposite direction, said last named means including a sliding sleeve member having a flange adapted to coact with a shoulder upon the shank to limit the axial movement of the sleeve and tap holding member relative to said shank, spring means carried by said tap holding member and engaging said double clutch member and tending to maintain said double clutch member in engagement with the teeth on said shank member, and a removable collet carried by said tap holding member for retaining a tap therein.

OSKAR KYLIN.